US010606904B2

(12) United States Patent
Musuluri

(10) Patent No.: US 10,606,904 B2
(45) Date of Patent: Mar. 31, 2020

(54) SYSTEM AND METHOD FOR PROVIDING CONTEXTUAL INFORMATION IN A DOCUMENT

(71) Applicant: Aravind Musuluri, Birmingham, AL (US)

(72) Inventor: Aravind Musuluri, Birmingham, AL (US)

(\*) Notice: Subject to any disclaimer, the term of this patent is extended or adjusted under 35 U.S.C. 154(b) by 0 days.

(21) Appl. No.: 15/210,871

(22) Filed: Jul. 14, 2016

(65) Prior Publication Data

US 2017/0017647 A1 Jan. 19, 2017

Related U.S. Application Data

(60) Provisional application No. 62/192,068, filed on Jul. 14, 2015.

(51) Int. Cl.
*G06F 17/30* (2006.01)
*G06F 16/93* (2019.01)

(52) U.S. Cl.
CPC .................................. *G06F 16/94* (2019.01)

(58) Field of Classification Search
CPC ......... G06F 17/30014; G06F 17/30864; G06F 17/30867; G06F 17/30554; G06F 17/3025; G06F 17/3053; G06F 17/30991

USPC .......................................................... 707/706
See application file for complete search history.

(56) References Cited

U.S. PATENT DOCUMENTS

| | | | | |
|---|---|---|---|---|
| 9,208,230 B2* | 12/2015 | Cohen | ............... | G06F 17/30864 |
| 9,536,006 B2* | 1/2017 | Cohen | ............... | G06F 17/30864 |
| 2005/0044497 A1* | 2/2005 | Kotler | ................... | G06F 17/211 |
| | | | | 715/225 |
| 2010/0185979 A1* | 7/2010 | Shores | .................. | G06F 3/0481 |
| | | | | 715/809 |
| 2012/0102015 A1* | 4/2012 | D'Onofrio, II | ....... | G06F 16/258 |
| | | | | 707/706 |
| 2012/0109941 A1* | 5/2012 | Cohen | ............... | G06F 17/30864 |
| | | | | 707/722 |
| 2013/0091412 A1* | 4/2013 | van den Broek | ........................... | |
| | | | | G06F 17/30572 |
| | | | | 715/227 |
| 2014/0081941 A1* | 3/2014 | Bai | ......................... | G06F 16/93 |
| | | | | 707/706 |
| 2016/0041986 A1* | 2/2016 | Nguyen | ................. | G06Q 50/01 |
| | | | | 707/711 |
| 2016/0078137 A1* | 3/2016 | Cohen | ............... | G06F 17/30864 |
| | | | | 707/706 |

\* cited by examiner

*Primary Examiner* — Sheree N Brown

(57) ABSTRACT

Systems and methods for enhancing user experience in a document viewing environment are provided. The method includes displaying contextual information for an entity comprising of key/value pairs in the document thereby enhancing the user experience.

11 Claims, 7 Drawing Sheets

Internet Navigator www.information.com/university_of_colorado_boulder

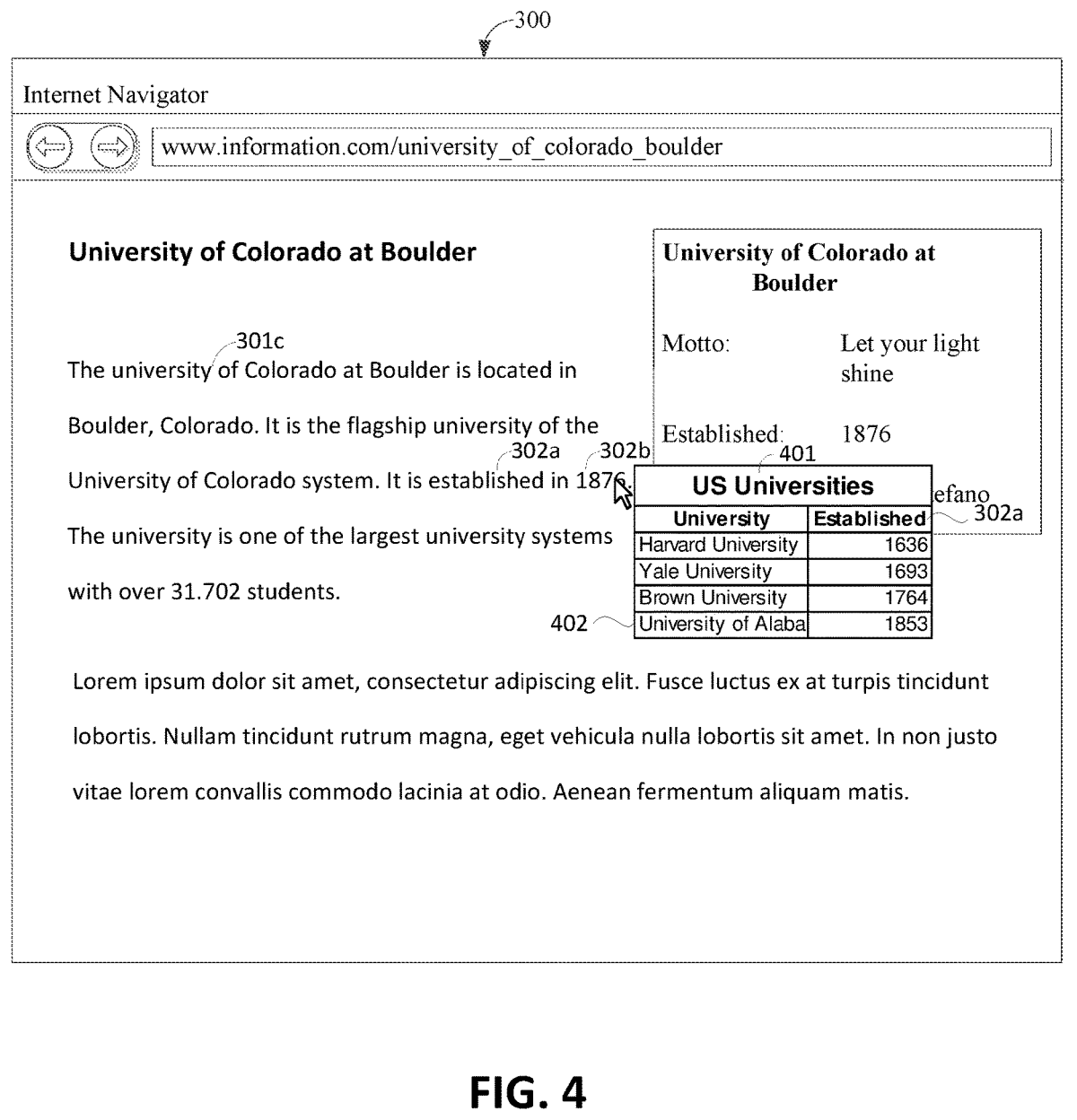

University of Colorado at Boulder

The university of Colorado at Boulder is located in

Boulder, Colorado. It is the flagship university of the

University of Colorado system. It is established in 1876.

The university is one of the largest university systems with over 31.702 students.

| University of Colorado at Boulder | |
|---|---|
| Motto: | Let your light shine |
| Established: | 1876 |

| US Universities | |
|---|---|
| University | Established |
| Harvard University | 1636 |
| Yale University | 1693 |
| Brown University | 1764 |
| University of Alaba | 1853 |

Lorem ipsum dolor sit amet, consectetur adipiscing elit. Fusce luctus ex at turpis tincidunt lobortis. Nullam tincidunt rutrum magna, eget vehicula nulla lobortis sit amet. In non justo vitae lorem convallis commodo lacinia at odio. Aenean fermentum aliquam matis.

FIG. 4

SYSTEM AND METHOD FOR PROVIDING CONTEXTUAL INFORMATION IN A DOCUMENT

CROSS REFERENCE TO RELATED APPLICATION

This application claims priority to U.S. Provisional Application Ser. No. 62/192,068 entitled "System And Method For Providing Contextual Information In A Document" filed on Jul. 14, 2015, which is incorporated herein by reference.

TECHNICAL FIELD

The present disclosure generally relates to providing contextual information in a document. Particularly, the disclosure relates to providing contextual information for an entity comprising of key/value pair(s) in a document.

BACKGROUND

The statements in this section merely provide background information related to the present disclosure and may not constitute prior art.

Documents contain information and are ubiquitous. Some documents may be of interest to a few, while others may be read by a wide variety of users. While information within a document is sometimes sufficient to fully comprehend by itself, oftentimes a user has to refer to external sources for clarifications and context. This is well understood by document authors and they address this problem through references, footnotes and external sources sections within the document. However, providing clarifications and contextual information through references, footnotes and external sources sections is not optimal. It takes time and effort to create these sections. These sections make documents lengthier and difficult to handle and all the users may not find the information useful. They are also prone to errors. Moreover, these sections are static and won't change with changing information unless the document author revises the document.

While methods exist in the art to dynamically provide contextual information, such as providing a definition to a word, they are rudimentary and do not cover all the needs.

In view of the above drawbacks, there remains a need for providing contextual information within documents dynamically and automatically.

SUMMARY

The following presents a simplified summary of the disclosure in order to provide a basic understanding to the reader. This summary is not an extensive overview of the disclosure and it does not identify key/critical elements of the disclosure or delineate the scope of the disclosure. Its sole purpose is to present some concepts disclosed herein in a simplified form as a prelude to the more detailed description that is presented later.

According to aspects herein, the present disclosure relates to a method of providing contextual information in a document.

In one aspect, the invention relates to a computer implemented method to automatically identify contextual information for an entity in a document said method comprising (a) Identifying by a user, a key and/or value pair for which the user desires contextual information (b) Identifying an entity for said key and/or value pair (c) Identifying a category for said entity (d) Identifying other entities belonging to the category by performing a search operation for search results comprising document(s) containing the category and the key and/or value (e) Returning the identified entities to the user. The key may be implicit or explicit in the document for which contextual information is desired by the user.

In a preferred embodiment of this aspect, the category is present in a title of the search result document(s). The category in accordance with the present invention may be a parent category or subcategory.

The search results of the search operation may be in a tabular or list form. For results in a tabular form, the key may be contained in a column header or title of the table. For list results, the key and/or value may be contained in the title in addition to the category.

The search results may be returned to the user in the form of a table, list, an answer generated from the table/list or a link. In a preferred embodiment, the results are returned in list/table form.

In another aspect of the present disclosure is provided with a system comprising search engine unit. The search engine unit may comprise one or more logics configured to perform the functions and operations associated with the above-disclosed methods.

In another aspect of the present disclosure is provided a computer program product executable in a memory of a search engine unit

BRIEF DESCRIPTION OF THE DRAWINGS

The drawings described herein are for illustration purposes only and are not intended to limit the scope of the present disclosure in anyway. Throughout the disclosure, like elements are represented by like reference numerals, which are given by way of illustration only and thus are not limitative of the various embodiments.

Other objects and advantages of the present disclosure will become apparent to those skilled in the art upon reading the following detailed description of the preferred embodiments, in conjunction with the accompanying drawings, wherein:

FIG. 4 illustrates an exemplary document with contextual information automatically generated for an entity from a corresponding category and key in a tabular form in accordance with an embodiment of the present disclosure.

DETAILED DESCRIPTION

Figure 1:
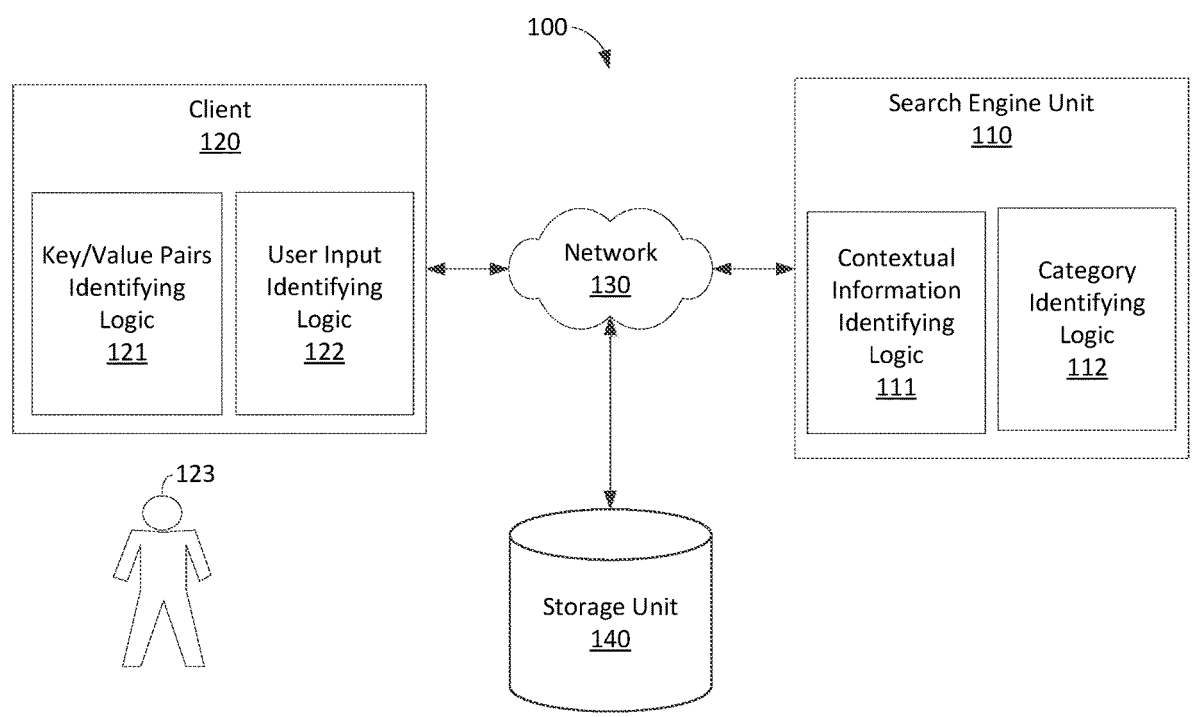
FIG. 1 is a block diagram illustrating an exemplary system for providing contextual information in documents in accordance with an embodiment of the present disclosure.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and the like, herein do not denote any order, quantity, or importance, but rather are used to distinguish one element from another.

Document in the present disclosure means any electronic document. Document may be, but not limited to a PDF, a presentation, a spreadsheet, a webpage, a search results page, an email, a markup language file, a word document or an office document.

FIG. 1 depicts a system 100 for providing contextual information within a document in accordance with an exemplary embodiment of the present disclosure. It will be understood and appreciated by those of ordinary skill in the art that the computing system architecture 100 shown in FIG. 1 is merely an example of one suitable computing system and is not intended to suggest any limitation as to the scope of use or functionality of the present invention. Neither should the computing system architecture 100 be interpreted as having any dependency or requirement related to any single module/component or combination of modules/components illustrated therein.

The system 100 comprises a search engine unit 110, a client 120 and a storage unit 140. The search engine unit 110, the client 120 and the storage unit 140 all communicate over a network 130.

The network 130 can include any type of network known in the art or future-developed. In this regard, the network 130 may be an Ethernet, a local area network (LAN), or a wide area network (WAN), e.g., the Internet, or a combination of networks.

The search engine unit 110 and the client 120 may be a dedicated or shared server including but not limited to any type of application server, database server, or file server configurable and combinations thereof. The search engine unit 110 and the client 120 may include, but are not limited to, a computer, handheld unit, mobile unit, consumer electronic unit, or the like.

Moreover, for the sake of clarity, the client 120 and the search engine unit 110 are shown as two distinct and separate units. Some or all of the logics of the client 120 may be part of the search engine unit 110 and vice versa.

The client 120 comprises key/value pairs identifying logic 121 and user input identifying logic 122.

The key/value pairs identifying logic 121 may be configured to identify key/value pair(s) present in a document. Further, the key/value pairs identifying logic 121 may be configured to identify for each key/value pair an entity referenced by the key/value pair.

In one embodiment, the key/value pairs identifying logic 121 may be optional when if the key/value pairs and their corresponding entities are pre-identified within a document.

In one embodiment, the key/value pairs and their corresponding entities are identified on the fly i.e. they are identified as the user is providing the input. For example, as the user is moving a mouse and placing the cursor within the vicinity of a key/value pair in a document.

In one embodiment the key/value pairs identifying logic 121 may highlight the identified key/value pairs in the document. The highlighting may be done by the key/value pairs identifying logic 121 by changing the presentation semantics of the identified key/value pairs and/or their corresponding entities present in the document. The presentation semantics of the identified key/value pairs and their corresponding entities may be different from the presentation semantics of the rest of the text in the document.

The presentation semantics may be selected from the group comprising font size, font type, font weight, text decorations, text alignment, background color, foreground color, word art, text effects and combinations thereof. Text decoration in accordance with the present invention is selected from the group comprising italicizing, underlining, letter spacing and combinations thereof.

The client 120 further comprises of the user input identifying logic 122. The user input identifying logic 122 may be configured to capture a user's desire for contextual information. In this regard, the user input identifying logic 122 may be continuously scanning for the selection of a key/value pair by the user and transmitting the selected key and/or value and the pair's entity to the search engine unit 110.

The exemplary search engine unit 110 comprises contextual information identifying logic 111 and category identifying logic 112.

In the exemplary search engine unit 110, the contextual information identifying logic 111 may be configured to identify contextual information for a given key/value pair and the pair's entity. The contextual information identifying logic 111 finds the contextual information by identifying entities belonging to the same category as the key/value pair's entity category by performing a search operation for search results comprising document(s) containing the category and the key and/or value. The process of identifying contextual information by the contextual information identifying logic 111 is further explained with reference to FIG. 4 through FIG. 6.

The document according to the disclosure may include an entire document or a portion of a document.

The search engine unit 110 may further comprises the category identifying logic 112 which may be configured to identify category of a key/value pair's entity.

In one embodiment, the category identifying logic 112 may reside on the client 120, in which case the client 120 may transmit key/value pair and the pair's entity category to the search engine unit 110.

The storage unit 140 is configured to store information associated with providing contextual information, or the like. In various embodiments, such information may include, without limitation, documents, webpages, entities from documents, entity categories, subcategories and parent categories of categories, indexes, information associated therewith, and the like. In embodiments, the storage unit 140 is configured to be searchable for one or more of the items stored in association therewith. It will be understood and appreciated by those of ordinary skill in the art that the information stored in association with the storage unit 140 may be configurable. The content and volume of such information are not intended to limit the scope of embodiments of the present disclosure in any way. Further, though illustrated as a single, independent component, the storage unit 140 may, in fact, be a plurality of storage units, for instance a database cluster, portions of which may reside on the search engine unit 110, the client 120, another external computing device (not shown), and/or any combination thereof. Moreover, the storage unit 140 may be included within the search engine unit 110 or client 120 as a computer-storage medium. The single unit depictions are meant for clarity, not to limit the scope of embodiments in any form.

A user 123 may select a key/value pair within a document and upon detecting the user selection by the user input identifying logic 122, the client 120 transmits to the search engine unit 110 the key/value pair and the pair's entity. Upon receiving the key and/or value pair and the pair's entity, the category identifying logic 112 may identify the category of the entity. The contextual information identifying logic 111 may then identify the contextual information for the category, key and value pair and transmit it back to the client 120 which displays the information to the user 123.

Note that the disclosure may be practiced with keys, values or both.

Figure 2:
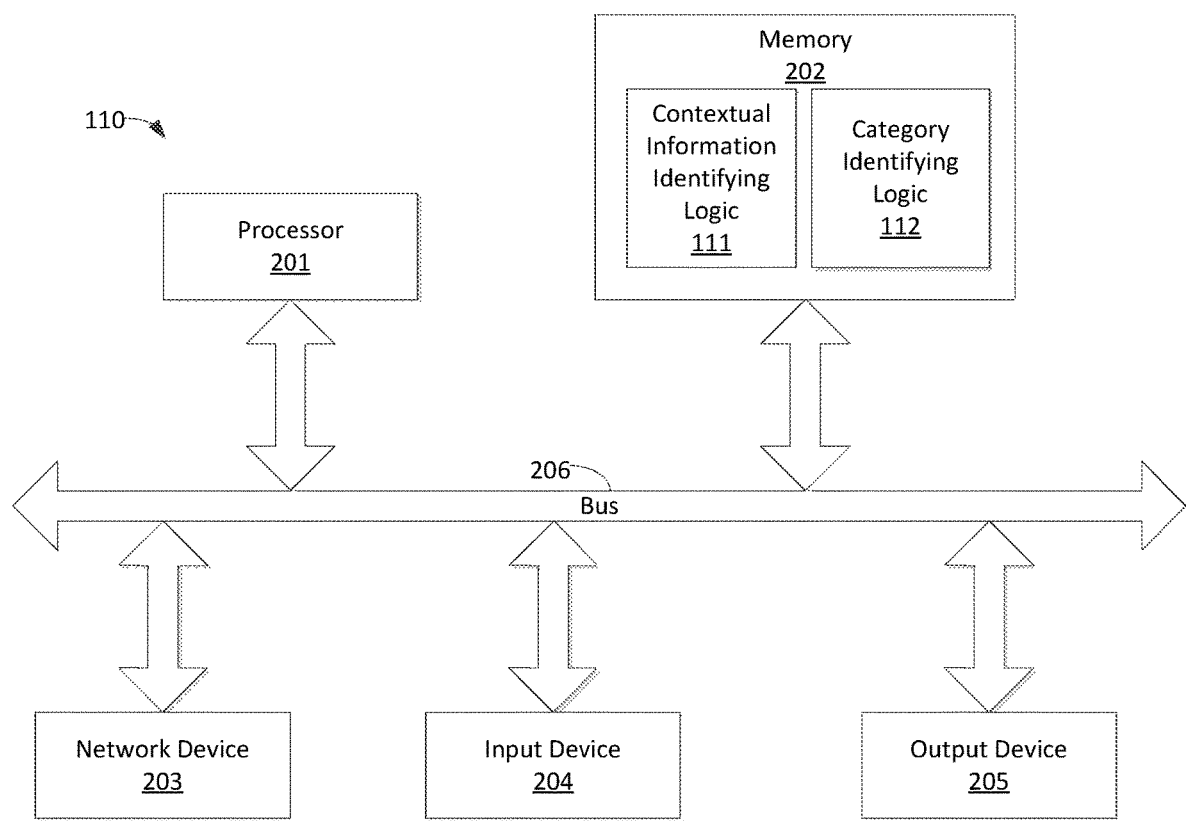
FIG. 2 is a block diagram of an exemplary search engine computing device of FIG. 1.

In some preferred embodiments, the search engine unit 110 is shown in FIG. 2. It should be noted, however, that embodiments are not limited to implementation on such computing devices, but may be implemented on any of a variety of different types of computing units within the scope of embodiments hereof. The search engine unit 110 (as shown in FIG. 1) is only one example of a suitable computing/search environment and it is not intended to suggest any limitation as to the scope of use or functionality of the disclosure.

In some embodiments, the search engine unit 110 may include a bus 206, a processor 201, memory 202, network device 203, input device 204, and an output device 205. Bus 206 may include a path that permits communication among the components of the search engine unit 110.

The search engine unit 110 stores the contextual information identifying logic 111 and the category identifying logic 112 as software in memory 202.

The memory 202 may be any type of computer memory known in the art or future-developed for electronically storing data and/or logic, including volatile and non-volatile memory. In this regard, memory 202 can include random access memory (RAM), read-only memory (ROM), flash memory, any magnetic computer storage unit, including hard disks, floppy discs, or magnetic tapes, and optical discs.

The processor 201 comprises processing hardware for interpreting or executing tasks or instructions stored in memory 202. Note that the processor 201 may be a microprocessor, a digital processor, or other type of circuitry configured to run and/or execute instructions.

The network device 203 may be any type of network unit (e.g., a modem) known in the art or future-developed for communicating over a network 130 (FIG. 1). In this regard, the search engine unit 110 (FIG. 1) communicates with the storage unit 140 (FIG. 1) and the client 120 (FIG. 1) over the network 130 (FIG. 1) via the network device 203.

The input device 204 is any type of input unit known in the art or future-developed for receiving data. As an example, the input device 204 may be a keyboard, a mouse, a touch screen, a serial port, a scanner, a camera, or a microphone.

The output device 205 may be any type of output unit known in the art or future-developed for displaying or outputting data. As an example, the output device 205 may be a liquid crystal display (LCD) or other type of video display unit, a speaker, or a printer.

Note that the disclosure may also be practiced in a distributed computing environment where tasks or instructions of search engine unit 110 (FIG. 1) are performed by multiple computing units communicatively coupled to the network.

Further note that, the search engine unit 110 (FIG. 1) components may be implemented by software, hardware, firmware or any combination thereof. In the exemplary search engine unit 110, depicted by FIG. 1, all the components are implemented by software and stored in memory 202.

Figure 3:
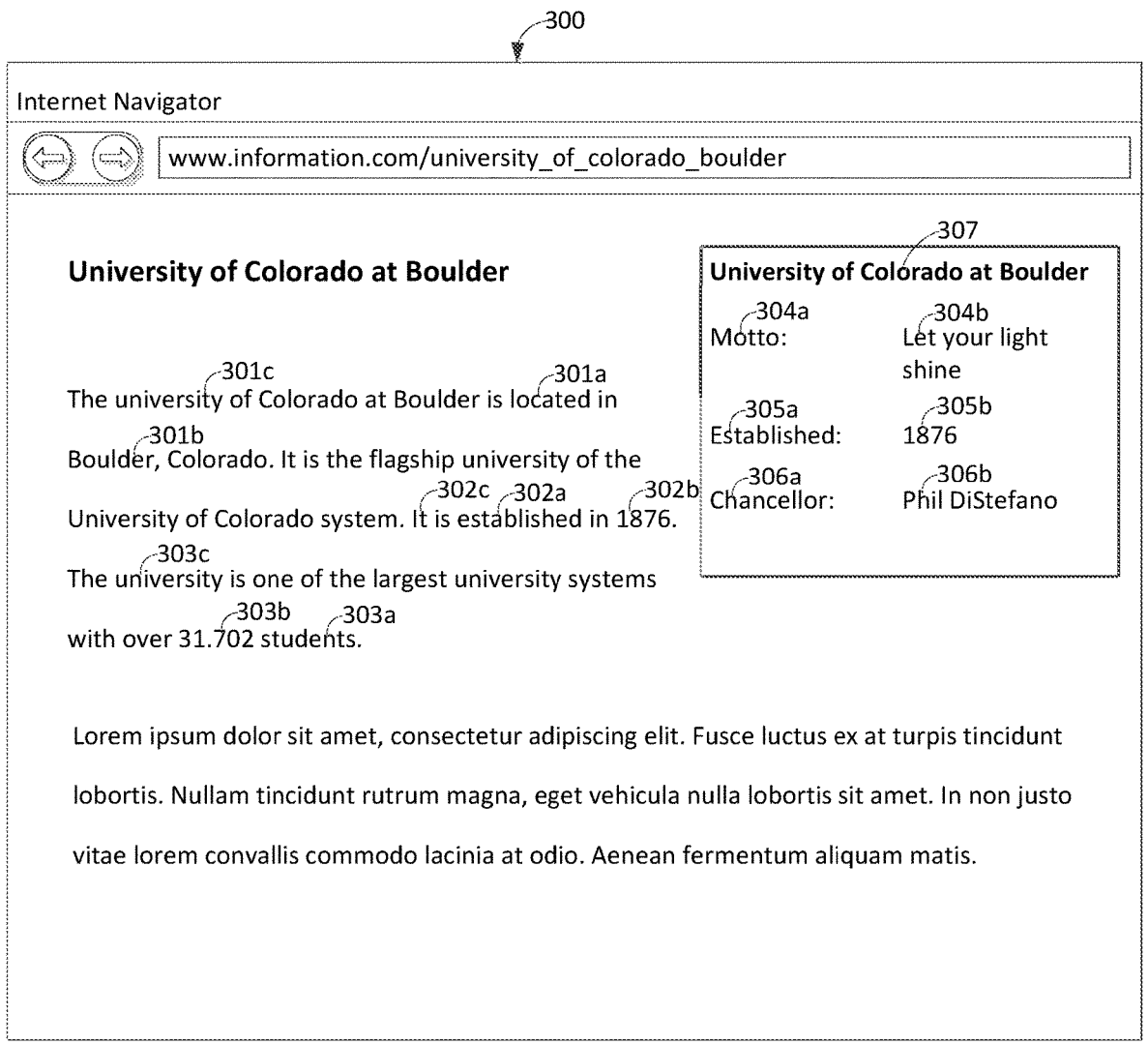
FIG. 3 illustrates an exemplary document comprising of an entity and the entity key/value pairs.

FIG. 3 illustrates a portion of an exemplary document 300. The key/value pairs identifying logic 121 (FIG. 1) may identify 301a/301b, 302a/302b, 303a/303b, 304a/304b, 305a/305b and 306a/306b as key/value pairs in the document 300. The key/value pairs identifying logic 121 (FIG. 1) identifies "university of Colorado at Boulder" 301c as the entity for the key/value pair 301a/301b. The key/value pairs identifying logic 121 (FIG. 1) identifies "university of Colorado at Boulder" 301c as the entity for the key/value pair 302a/302b. This is done by first identifying pronoun "it" 302c as representing the entity and substituting the pronoun with the noun "university of Colorado at Boulder" 301c through natural language processing. Similarly, the entity for key/value pair 303a/303b is also identified as 301c.

For the key/value pairs 304a/304b, 305a/305b and 306a/306b which are depicted as key/value pairs in the document 300, the title or caption of the key/value pairs may be identified as the key/value pair entity.

The key/value pairs identifying logic 121 (FIG. 1) may use natural language processing techniques, analyzing text patterns, presentation semantics, titles, captions or any other method known in the art to identify key/value pairs and their corresponding entities.

FIG. 4 illustrates providing contextual information in the document 300 (FIG. 3) in accordance with an embodiment of the present disclosure. For example, if a user 123 (FIG. 1) desires to compare the year of establishment of University of Colorado at Boulder with other universities, the user may simply select the "established" key 302a or "1876" value 302b by placing the cursor over the key 302a or value 302b. The key 302a and the corresponding "University of Colorado at Boulder" entity 301c are transmitted to the search engine unit 110 (FIG. 1) by the client 120 (FIG. 1). In response to receiving the key 302a and the entity 301c as input, the category identifying logic 112 (FIG. 2) identifies "US Universities" subcategory as the category for the entity 301c. The contextual information identifying logic 111 (FIG. 1) performs a search for document(s) comprising the subcategory "US Universities" within the title/caption of table and one of the column headers of table matching the key 302a and identifies the table 402 from a document (not shown) as one of the search results. The table 402 comprises of "US Universities" 401 as title and the key 302a as the second column header. The search engine unit 110 returns the table 402 to the client 120 (FIG. 1) which in turn displays the table 402 to the user 123 (FIG. 1).

Note that in one embodiment, the entities from documents may be stored in the storage unit 140 (FIG. 1) and the contextual information identifying logic 111 (FIG. 1) may search the entities.

Note that the client 120 (FIG. 1) may let the user 123 (FIG. 1) specify his desire for contextual information is any number of ways. For example, but not limited to, selecting or placing cursor over or near the key or value.

Note that in one embodiment, a parent category or a subcategory may be identified for the key/value pair's entity.

Note that in one embodiment, in identifying a table for a key/value pair and the pair's category in a document, the contextual information identifying logic 111 (FIG. 1) may substitute equivalents words or phrases for category and header than those found in the document.

Note that in another embodiment, along with the contextual table data, the client may be shown additional information such as the source for the contextual table data, the number of rows, the number of columns etc., Note that in another embodiment, more than one table may be identified by the contextual information identifying logic 111 (FIG. 1) for a key/value pair and the pair's category and shown to the user.

Note that in another embodiment, instead of the table data, a summary or an answer may be generated out of the table data and displayed to the user.

Note that in another embodiment, instead of the table data, a link may be generated for the table data and displayed to the user.

Figure 5:
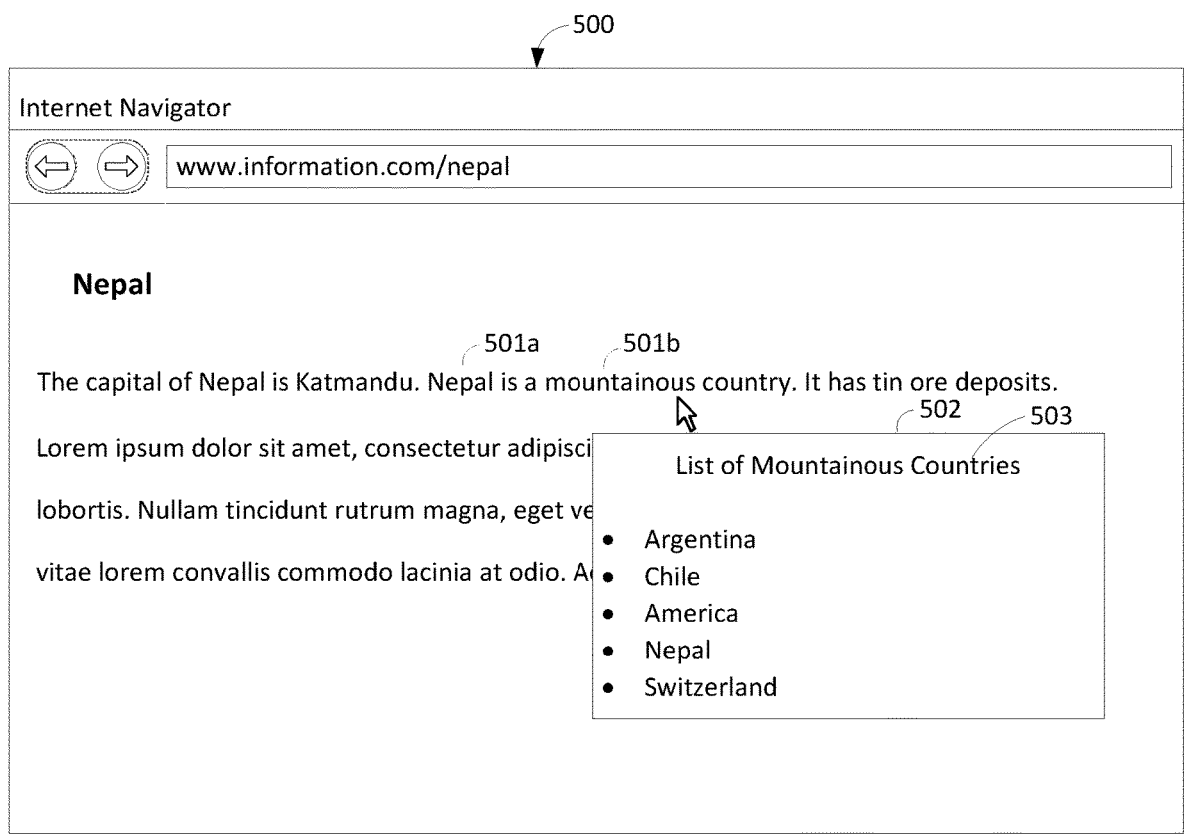
FIG. 5 illustrates another exemplary document with contextual information automatically generated for an entity from a corresponding category, key and value in a list form in accordance with an embodiment of the present disclosure.

FIG. 5 illustrates another exemplary document 500 with contextual information automatically generated for an entity from a corresponding category, key and value in a list form in accordance with an embodiment of the present disclosure. For example, if a user 123 (FIG. 1) desires to know other countries having mountainous terrain, the user may simply select the "mountainous" value 501*b*. The value 501*b* and the corresponding "Nepal" entity 501*a* are transmitted to the search engine unit 110 (FIG. 1) by the client 120 (FIG. 1). In response to receiving the value 501*b* and the entity 501*a* as input, the category identifying logic 112 (FIG. 2) identifies "countries" as the category for the entity 501*a*. The contextual information identifying logic 111 (FIG. 1) performs a search for document(s) comprising the category "countries" and value 501*b* within the title/caption of list and identifies the list 502 from a document (not shown) as one of the search results. The search engine unit 110 returns the list 502 to the client 120 (FIG. 1) which in turn displays the list 502 to the user 123 (FIG. 1).

Note that the key "terrain" is implicit for the value "mountainous" 501*b*. Further note that the key "terrain" is implicit within the title of the list 502.

Figure 6:
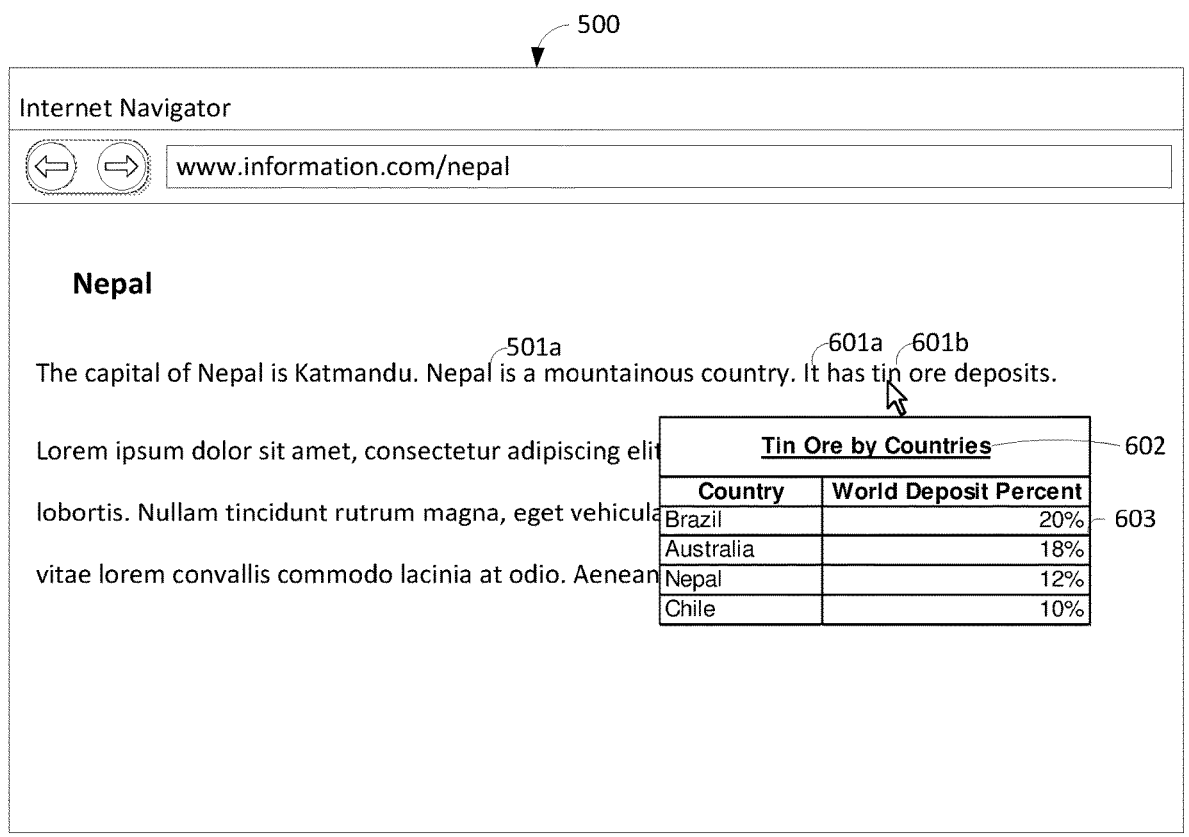
FIG. 6 illustrates another exemplary document with contextual information automatically generated for an entity from a corresponding category, key and value in a tabular form in accordance with an embodiment of the present disclosure.

FIG. 6 illustrates automatic contextual information generation for the entity 501*a* (FIG. 5) in the exemplary document 500 (FIG. 5) from a corresponding category, key and value in a tabular form in accordance with an embodiment of the present disclosure. For example, if a user 123 (FIG. 1) desires to know other countries with tin ore deposits, the user may simply select the "tin ore" value 601*b*. The key/value pairs identifying logic 121 (FIG. 1) identifies "nepal" 501*a* as the entity for the value 601*b*. This is done by first identifying pronoun "it" 601*a* as representing the entity and substituting the pronoun with the noun "nepal" 501*a* through natural language processing. The value 601*b* and the corresponding entity 501*a* are transmitted to the search engine unit 110 (FIG. 1) by the client 120 (FIG. 1). In response to receiving the value 601*b* and the entity 501*a* as input, the category identifying logic 112 (FIG. 2) identifies "countries" 503 as the category for the entity 501*a*. The contextual information identifying logic 111 (FIG. 1) performs a search for document(s) comprising the category "countries" and value 601*b* within the title/caption of table and identifies the table 603 from a document (not shown) as one of the search results. The search engine unit 110 returns the table 603 to the client 120 (FIG. 1) which in turn displays the table 603 to the user 123 (FIG. 1).

Figure 7:
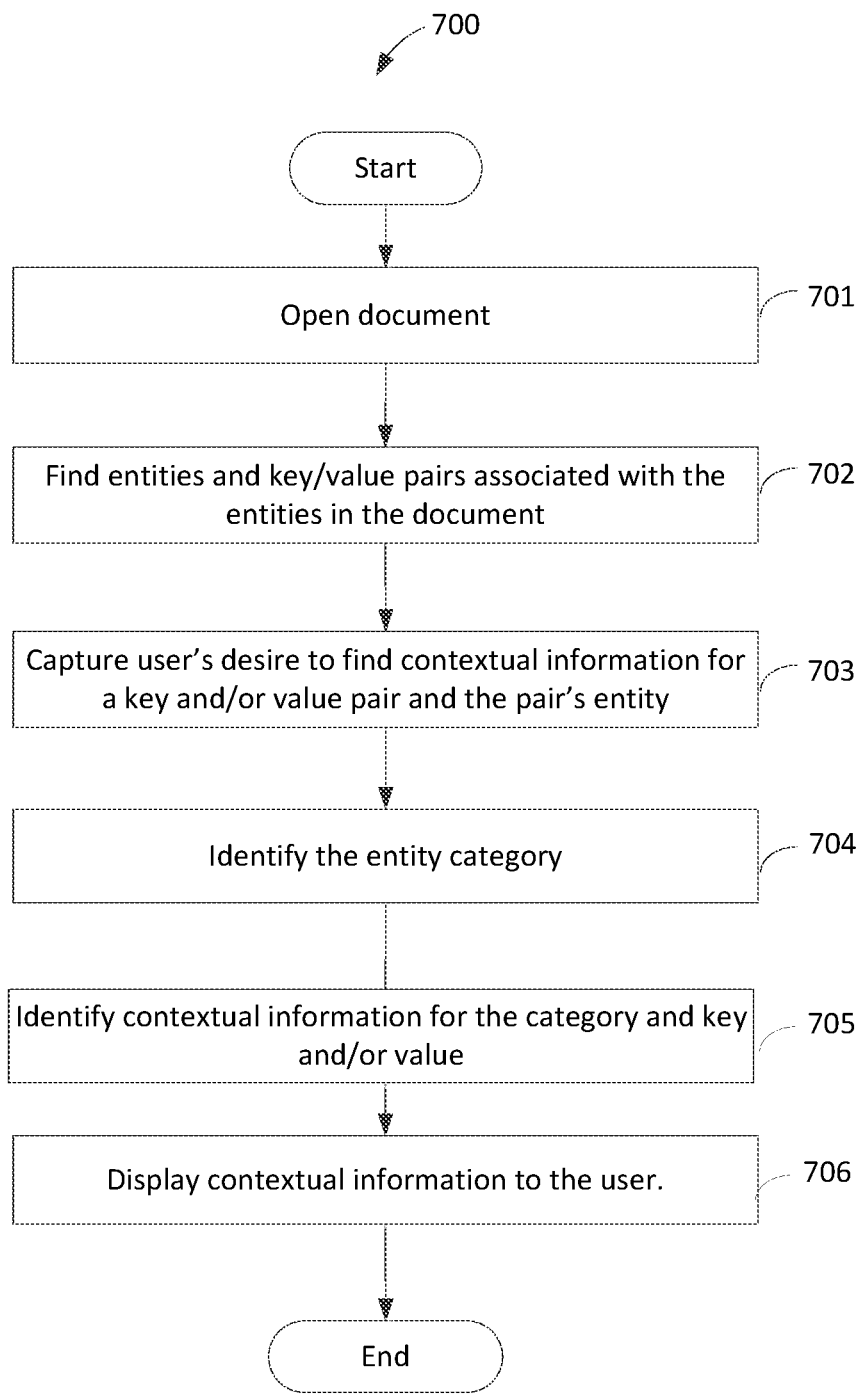
FIG. 7 is a flow diagram of a method of providing contextual information for entities in documents in accordance with one or more embodiments.

FIG. 7 is a flowchart illustrating one method in accordance with the present disclosure. In step 701, a user 123 (FIG. 1) may open a document on the client 120 (FIG. 1). In step 702, the key/value pairs identifying logic 121 (FIG. 1) may identify key/value pairs present in the document and may change the presentation schematics of the key/value pairs. In step 703, the user input identifying logic 122 (FIG. 1) may capture the user's desire for contextual information for a key and/or value pair and the pair's entity. In step 704, the category identifying logic 112 may identify the category of the entity. In step 705, the contextual information for the key and/or value pair and the entity category is identified by the contextual information identifying logic 111 (FIG. 1) and sent to the client 120 (FIG. 1). In step 706, the client 120 may display the contextual information to the user 123 (FIG. 1).

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

The invention claimed is:

1. A method for automatically providing contextual information for a key and/or value in an electronic document displayed to a user by a computing device, the method comprising:
   a. displaying to a user by a computing device an electronic document;
   b. selecting by the user through an input device of the computing device, a key and/or value in the electronic document;
   c. determining, by a processor, an entity for the key and/or value in the electronic document pre-identified within the document and/or by natural language processing techniques, analyzing text patterns, presentation semantics, titles, and/or captions;
   d. identifying a category for the entity;
   e. performing a search operation by a search engine processor for electronic document(s) comprising of the category and at least one of the key or value;
   f. identifying, by the search engine processor, entities within the electronic document(s) found by the search engine belonging to the identified category;
   g. altering the electronic document displayed to the user by the computing device by incorporating within the electronic document the identified entities from the electronic document(s) found by the search engine; and
   h. displaying the altered electronic document to the user by the computing device.

2. The method as in claim 1, wherein the category is present in a title in the document(s) found by the search engine.

3. The method as in claim 2, wherein the identified entities in the document(s) found by the search engine are in a table.

4. The method as in claim 3, wherein a column header of the table comprises of the key.

5. The method as in claim 2, wherein the identified entities in the document(s) found by the search engine are in a list.

6. The method as in claim 5, wherein a title of the list comprises of the key and/or value.

7. The method as in claim 1, wherein the key is implicit.

8. The method as in claim 1, wherein the identified entities are returned to the user in table or list form.

9. The method as in claim 1, wherein the category for the entities is a parent category.

10. The method as in claim 1, wherein the category for the entities is a subcategory.

11. The method as in claim 1, wherein the key and/or value in the electronic document is highlighted.

* * * * *